US009351335B2

(12) United States Patent  (10) Patent No.: US 9,351,335 B2
Conte et al.  (45) Date of Patent: May 24, 2016

(54) METHOD FOR TRANSMITTING BROADCAST SERVICES IN A RADIOCOMMUNICATION CELLULAR NETWORK THROUGH A FEMTO BASE STATION, AND CORRESPONDING FEMTO BASE STATION

(75) Inventors: Alberto Conte, Cachan (FR); Brice Leclerc, Arpajon (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1080 days.

(21) Appl. No.: 12/453,975

(22) Filed: May 28, 2009

(65) Prior Publication Data

US 2009/0300689 A1  Dec. 3, 2009

(30) Foreign Application Priority Data

May 30, 2008 (EP) .................................. 08305215

(51) Int. Cl.
*H04W 88/04* (2009.01)
*H04N 21/65* (2011.01)
*H04W 84/04* (2009.01)
*H04W 88/06* (2009.01)

(52) U.S. Cl.
CPC .............. *H04W 88/04* (2013.01); *H04N 21/65* (2013.01); *H04Q 2213/13039* (2013.01); *H04Q 2213/13098* (2013.01); *H04Q 2213/13242* (2013.01); *H04Q 2213/13298* (2013.01); *H04Q 2213/13332* (2013.01); *H04W 84/045* (2013.01); *H04W 88/06* (2013.01)

(58) Field of Classification Search
USPC ......................................................... 725/62
See application file for complete search history.

(56) References Cited

U.S. PATENT DOCUMENTS 7,423,699 B2 *  9/2008  Vorenkamp et al. .......... 348/726
7,593,729 B2 *  9/2009  Barak et al. ................ 455/435.1

(Continued)

FOREIGN PATENT DOCUMENTS

CN         1823499 A    8/2006
CN       101083681 A   12/2007

(Continued)

OTHER PUBLICATIONS

Daniel Negru et al., "IPv6 over DVB-T: Mobility Issues and Challenges" Jul. 6, 2004, pp. P3/1-p3/10, URL: http://www.comp.brad.ac.uk/het-net/HET-NETs04/CameraPapers/P3.pdf.

*Primary Examiner* — Pankaj Kumar
*Assistant Examiner* — Charles N Hicks
(74) *Attorney, Agent, or Firm* — Harness, Dickey & Pierce, P.L.C.

(57) ABSTRACT

The invention concerns a method and a Femto base station for transmitting broadcast services from a radiocommunication cellular network (10) to a mobile terminal (2), said mobile terminal (2) being adapted to receive said broadcast services either, in a first general mode, directly from one global base station (1) among a plurality of global base stations belonging to said radiocommunication cellular network (10), or, in a second specific mode, through a Femto base station (3). According to the invention, said method comprises the step of receiving (S30) at said Femto base station (3) services which are broadcast by the global base station (1) in the coverage of which said Femto base station (3) is located and the step of relaying (S32) the received services from said Femto base station (3) so that said mobile terminal (2) can receive the relayed services when it is in the second specific mode.

10 Claims, 3 Drawing Sheets

(56) References Cited

U.S. PATENT DOCUMENTS

2007/0050820 A1* 3/2007 Saarikivi et al. ............... 725/62
2009/0288122 A1* 11/2009 Zellner et al. .................. 725/64

FOREIGN PATENT DOCUMENTS

| GB | 2 407 456 | 4/2005 |
| WO | WO-2007092269 A1 | 8/2007 |

* cited by examiner

METHOD FOR TRANSMITTING BROADCAST SERVICES IN A RADIOCOMMUNICATION CELLULAR NETWORK THROUGH A FEMTO BASE STATION, AND CORRESPONDING FEMTO BASE STATION

The invention relates generally to radiocommunication network, and in particular to a method for transmitting broadcast services to a mobile terminal through the use of a Femto base station.

Radiocommunication systems are always more and more efficient. New techniques used at the radio interface, and more particularly at the base station associated to each cell of the network, allow higher flow rates. Thanks to such rates, mobile operators can allow users not only to perform voice or data communication but also to receive new multimedia services such as broadcast television program on their cellular handsets. Each day, new people attracted by all these services, decide to buy a mobile terminal and to take out a subscription to these services.

In order to ensure a permanent access and a high quality of service level for all users, mobile operators must regularly install new base stations to enable a wide and efficient coverage area. However, even if the new base stations are more powerful, they can only manage a limited number of users who are located in the same cell at the same time. Since the number of users regularly increases, mobile operators are therefore obliged to increase the existing base stations to provide sufficient level of services in areas of high density.

Unfortunately, developments of such infrastructures create a huge cost to mobile operators which often report it on users' subscriptions. To avoid such extra cost, it is known to deploy micro cells base stations in some specific places.

Such a solution comes from the observation that, even when the user is at home or at his office, he still uses his mobile terminal by habit or convenience to reach services provided by the mobile operators instead of using his fixed network generally available at his home or office. In order to lighten the traffic with the global cellular base station which covers the geographical area of the user's home or office, it has already been proposed to install an access point base station, also known as a Femto Base Station or FBS, connected to the fixed network of the user's home or office, and to use this Femto base station and the fixed network instead of the global base station to communicate with the mobile terminal.

Figure 1:
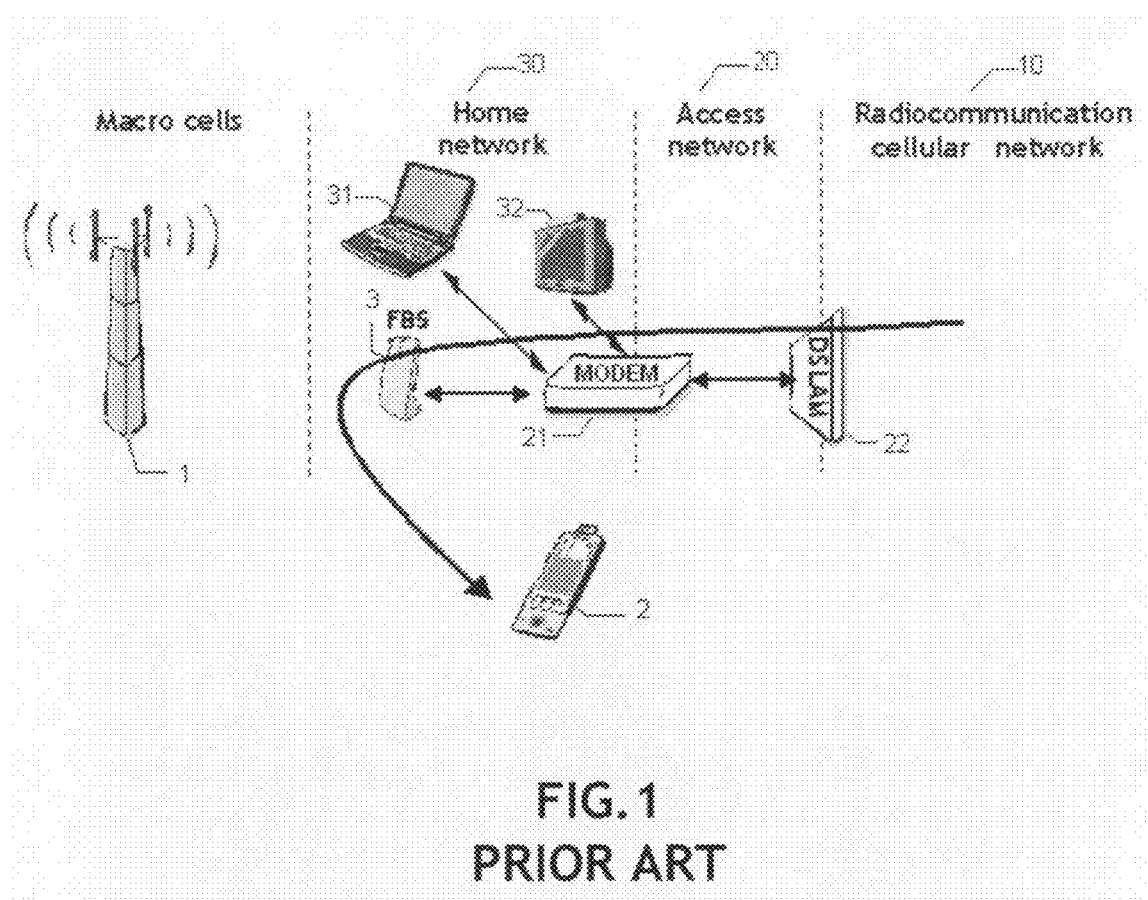

FIG. 1 shows a schematic architecture of different elements involved in such known solution. The architecture may classically comprise:
  A global base station 1 which belongs to a radiocommunication cellular network 10 and which covers a specific geographic area including the user's home or office;
  A mobile terminal 2 enabling the user to perform a communication or to receive broadcast services provided by said radiocommunication cellular network 10;
  An Access Point Base Station or FBS 3 adapted to perform a radio communication with mobile terminal 2;
  A fixed access network 20 comprising a DSL backhaul composed of a modem 21 and a DSLAM 22 to provide a high speed Internet connection;
  A home network 30 comprising said modem 21 and said FBS 3, and among other, a personal computer 31 and a television device 32.

Global base station 1 is a standard base station of radiocommunication cellular network 10. Radiocommunication cellular network 10 can be a GSM network, a third mobile generation such as an UMTS cell network or functions under a WiMAX solution. Global base station 1 is adapted to identify all mobile terminals that are in its coverage area. Connection with a specific mobile terminal located in the cell's coverage is established through this global base station for each call or data transmission from or to this specific mobile terminal. Such a base station 1 can also permanently broadcast contents such as broadcast services so that all users in the coverage area can receive and use these services on their mobile terminal.

Femto Base Station 3 is provided by the mobile operator to his subscribers and consists in a simplified base station with a limited power typically designed for use in a residential or small business environment. The fact that FBS 3 is simple and less powerful than a global base station enables a low cost fabrication. FBS 3 is able to cover a small area and can tolerate a small number of mobile phones (usually one to five) that have been mated to said FBS. FBS 3 is able, on one hand, to communicate via a radio interface with mobile terminal 2 and, on the other hand, to communicate with radiocommunication cellular network 10 through modem 21 by using a high speed Internet connection 22 available at the home or office of the user. Although in FIG. 1, the high speed Internet connection is provided by a DSL line, the connection can also be provided by another high throughput access, such as, for example, a cable access.

Hence, when the user is not in the proximity of FBS 3, all communications initiated or received by his mobile terminal 2 are classically performed via global cellular base station 1 or any other base stations of the cell in which the user is located. Said mobile terminal 2 can also receive all the services which are broadcast permanently by those base stations. On the other hand, as soon as mobile terminal 2 is in the coverage area of Femto base station 3, i.e. when user is at his home or at his office, all communications initiated or received by mobile terminal 2 are performed through FBS 3 and the fixed network, using modem 21 and DSLAM device 22.

In this case, broadcast services provided by radiocommunication cellular network 10, are broadcast to FBS 3 via DSLAM 22 and Modem 21 of said access network 20 by using the IP address of said FBS 3. FBS 3 transmits received services to mobile terminal 2 and the user can consult them on his mobile terminal at any time.

Such a known solution enables thus to decongest global base station 1 whose coverage area includes the home or the office of a user in the sense that the base station has no longer to manage the mobile terminal of this user.

However, when the user's terminal 2 is connected with FBS 3, all the transmissions between mobile terminal 2 and radiocommunication cellular network 10 are performed using the high speed Internet connection of the user. Since the broadcast services are permanently sent to FBS 3 through the high speed Internet connection, the bandwidth of the DSL connection used to perform such a transmission may considerably reduce the throughput of other data streams which occur between modem 21 and other elements of home network 30 such as personal computer 31 or television 32 which also use the DSL connection. This is especially true for TV broadcast services.

In order to avoid such a drawback, an advanced solution could consist in broadcasting such services via the high speed Internet connection 21, 22 only when the user chooses to receive them on his mobile terminal 2.

Figure 2:
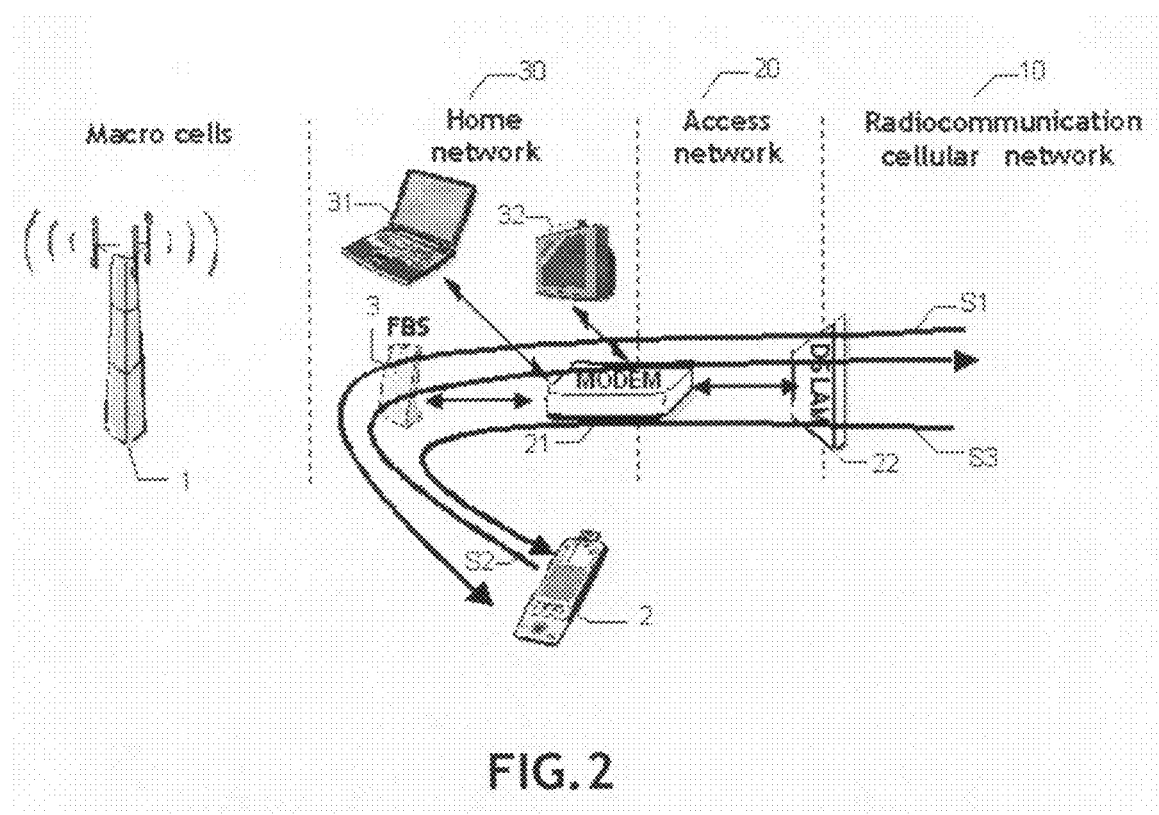

FIG. 2 shows schematically interactions between the different elements in this case.

Contrary to the solution disclosed on FIG. 1, mobile operator does not broadcast all the services permanently to FBS station 3. Indeed, when mobile terminal 2 is located in the coverage area of FBS 3, only a list of broadcast services such as EPG (Electronic Program Guide) or ESG (Electronic Service Guide) is transmitted from radiocommunication cellular network 10 to mobile terminal 2 through access network 20 and FBS 3 (Step S1 on FIG. 2).

If the user wants to receive a particular service, he selects this service among the list from his mobile terminal 2. The selection is first transmitted in an adapted message from mobile terminal to FBS 3 via a radio interface and FBS 3 transmits a request corresponding to the selection to radiocommunication cellular network 10 by using DSL backhaul 21, 22 (Step S2 on FIG. 2). Such a request can be realised by using a protocol of an IGMP (Internet Group Management Protocol) specifically adapted to access a multicast group.

Upon reception of the request, radiocommunication cellular network 10 identifies the requested service and the address of FBS 3. Upon such a identification, the service corresponding to the selection is transmitted via DSL backhaul to FBS 3 which transmits it to mobile terminal 2 (Step S3 on FIG. 2).

Thanks to this solution, the throughput of other data streams which occur between modem 21 and other elements of home network 20 such as personal computer 31 or television 32 would be reduced only in case a user has decided to consult a specific service on his terminal mobile.

However this solution would require providing mobile terminal 2, FBS 3 and mobile operator network 3 with complex and specific features.

Indeed, radiocommunication cellular network 10 must be able not only to determine that it should provide a list of services to a FBS 3 when the mobile terminal is located in the FBS's coverage area but must also be able to respond to a service request received from such a FBS 3.

In addition, FBS 3 must be able to convert the selection information received from terminal mobile 2 into an adapted request whereas, in the case of FIG. 1, said FBS was just used as a relay between mobile terminal 2 and radiocommunication cellular network 10.

Furthermore, terminal mobile 2 must be provided with a specific functionality capable of delivering a selection to FBS 3. When services are permanently broadcast, such a function is not necessary since the selection only happens in a transparent way on mobile terminal 2. New message structure for enabling the transmission of the selection on the radio interface between mobile terminal 2 and FBS 3 must also be created and normalized.

In addition to the problem of manufacturing costs, this solution does not completely avoid sharing bandwidth problem between all the different elements 3, 31, 32 of home network 30.

The aim of the present invention is to enable a user to receive broadcast services on his mobile terminal 2 through a FBS when he is at home or at his office without altering the bandwidth of the high speed Internet connection so that the different elements using this connection can still work correctly.

To this end, a first object of the invention is relative to a method for transmitting broadcast services from a radiocommunication cellular network to a mobile terminal according to claim 1.

A second object of the invention is a Femto base station for transmitting broadcast services from a radiocommunication cellular network to a mobile terminal according to claim 5.

The features and advantages of the invention will become more apparent from the following detailed description with reference to the attached figures wherein:

FIG. 1, already described, shows a schematic architecture of different elements for transmitting broadcast services to a mobile terminal either through a global base station or through a FBS according to the state of the art.

FIG. 2, already described, shows another specific architecture of different elements by which a radiocommunication cellular network could transmit services to a mobile terminal through a FBS.

Figure 3:
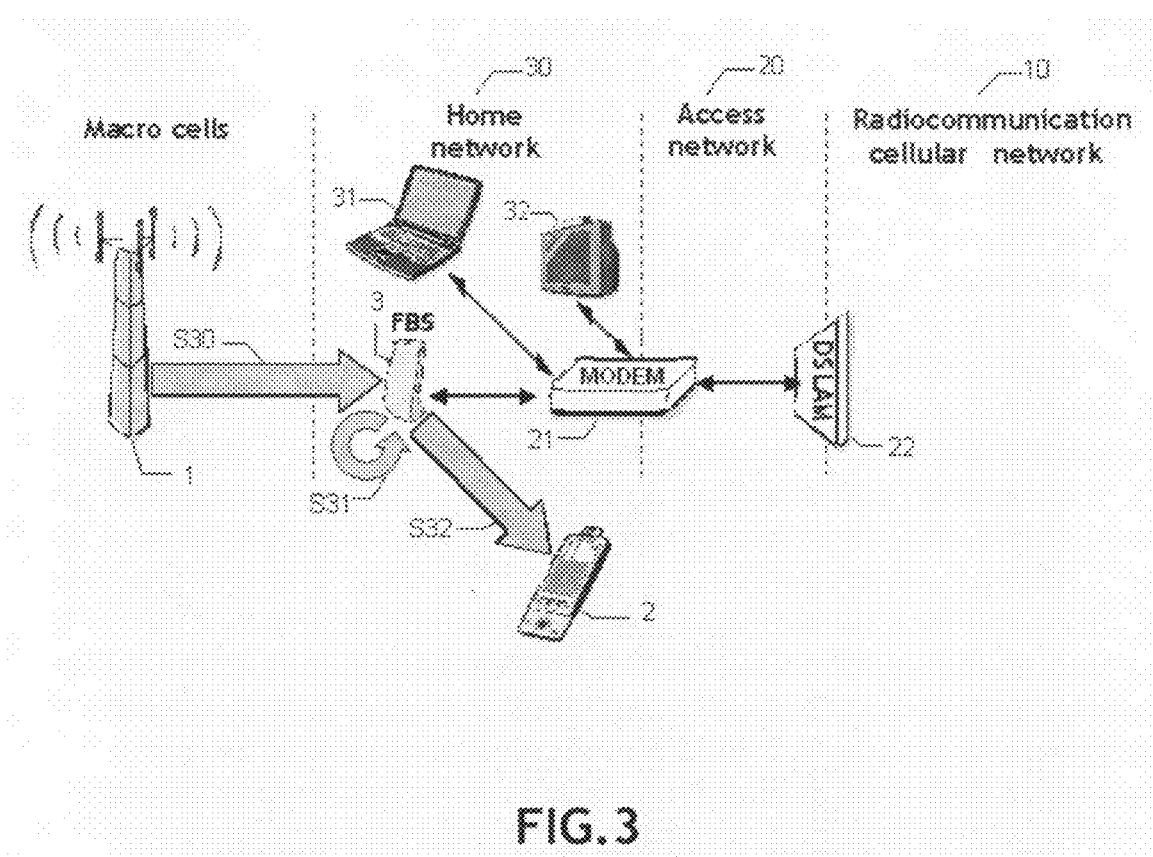

FIG. 3 represents schematically a specific preferred architecture of different elements for transmitting broadcast services to a mobile terminal either through a global base station or through a FBS according to the method of the invention.

As shown in FIG. 3, the architecture classically comprises components already described with FIG. 1 or FIG. 2, namely:
  a global base station 1 belonging to a radiocommunication cellular network 10;
  a Femto base station 3 provided in a domestic area such as a user's home or a user's office;
  a mobile terminal 2 adapted to receive broadcast services provided by a radiocommunication cellular network 10 either directly form the global station 1 or through Femto base station 3.

As already described with reference to FIG. 1, communications initiated or received by mobile terminal 2 are performed either via global base station 1 (general mode) of network 10 or via Femto base station 3 (specific mode), depending on the location of mobile terminal 2.

Assuming the subscription of the user also allows the reception of broadcast services, such as TV programs, the mobile terminal can also receive:
  in the general mode, while the user is far from home or office, such services as directly broadcast by global base station 1;
  in the specific mode, while the user is at home or in office, such services through Femto base station 3.

The method according to the invention differs from the method according to FIG. 1 in that broadcast services are not transferred from radiocommunication cellular network 10 to Femto base station 3 using the fixed access network 20. On the contrary, in the method according to the invention, Femto base station 3 directly receives services which are broadcast by the global base station 1 in the coverage of which the Femto base station is located (step S30 on FIG. 3).

Upon reception, Femto base station 3 is adapted to relay the received services in its coverage area (step S32 on FIG. 3). Then, if the user is located in the coverage area of Femto base station 3 and if his mobile terminal 2 is configured in the specific mode, the user can still receive the broadcast services on his mobile terminal 2.

One of the advantages of the method according to the invention is that, when the user uses his Femto base station 3, as recommended by the mobile operator, and wants to consult broadcast services on his mobile terminal 2, the bandwidth of his Internet high speed connection is not altered. Indeed, since the fixed network is not used anymore to convey broadcast services from radiocommunication cellular network 10 to Femto base station 3, the bandwidth remains available for home or office applications which use resources conveyed by the Internet connection.

Furthermore, the user will not be tempted to deactivate the specific mode of his mobile phone 2 to both receive broadcast services directly from global base station 1 and preserve his bandwidth for other purposes.

Another advantage of the invention is that the user may receive a service that requires a bandwidth greater than that available on the Internet connection. Indeed, in many areas, bandwidth provided by the Internet connection may be insufficient to convey services such as television programs. It would be damageable for a user not to receive such a program although it is broadcast by a radiocommunication cellular network through its global base stations.

In one embodiment of the invention, Femto base station 3 can modify the modulation and/or the coding scheme of received broadcast services before relaying the received services (Step S31 on FIG. 3). Thanks to this modification, the throughput of the transmission between Femto base station 3 and mobile terminal 2 can be increased while still using little power.

Indeed, a global base station currently uses modulations and coding schemes specifically adapted to enable mobile terminals and FBS, located at the edge of the cell, to correctly receive the broadcast services. Such modulation or coding scheme uses strong redundancy in order that the signal received at the cell's border can still be correctly interpreted. Such a redundancy is realized by using a great part of the transmitted bits for error detection purpose. Thus, in order to have payload data rates still adapted to the transmission of broadcast services, the global base station must transmit those services with a maximum of power. As an example, when a global base station belongs to a Wimax mobile network, broadcast services are currently transmitted by using a QPSK modulation (Quadrature Phase-Shift Keying).

Since the coverage area of Femto base station 3 is well adapted to the user's home or user's office, when mobile terminal 2 is in the specific mode, it will correctly receive signals emitted by Femto base station 3 without any significant alteration. Thus, it is not necessary that Femto base station 3 broadcast the services with a modulation or coding scheme using such an amount of bits per symbol designated to the error detection. Femto base station can typically use a 16-QAM or a 64-QAM modulation scheme (Quadrature Modulation Amplitude).

For performing such a modulation conversion, Femto base station can be provided with a specific modem (not shown). Such a modem will demodulate data relative to broadcast services once they have been received at Femto base station 3 and modulate them with a modulation scheme adapted to domestic broadcasting before Femto base station 3 relays broadcast services.

Femto base station 3 is also connected to mobile network 10 via a high speed Internet connection. Such a high speed connection can consist in a DSL connection or a cable connection. Thanks to this connection, the user will be able to perform voice or data communications when his mobile will be configured in the specific mode. Such communications are transmitted from radiocommunication cellular terminal/mobile network to radiocommunication cellular network/mobile terminal through FBS 3 and high speed Internet connection.

Advantageously, paging requests are also received at Femto base station 3 directly from the globat base station 1 in the coverage of which Femto base station 3 is located. In a second time, paging requests are then relayed from Femto base station 3 to mobile terminal 2 when it is in the specific mode. Response to these paging requests wilt be advantageously transmitted to radiocommunication cellular network 10 through Femto Base station 3 and high speed Internet connection.

The invention claimed is:

1. A method for transmitting broadcast services from a radiocommunication cellular network to a mobile terminal, the mobile terminal configured to receive the broadcast services either, in a first general mode, directly from one global base station among a plurality of global base stations of the radiocommunication cellular network, or, in a second specific mode, through a Femto base station, the Femto base station further connected to the radiocommunication cellular network via a high speed Internet connection for enabling voice or data communications between the mobile terminal and the radiocommunication cellular network when the mobile terminal is in the coverage of the Femto base station, the method comprising:

receiving directly at the Femto base station services which are broadcast by the one global base station among the plurality of global base stations in the radiocommunication cellular coverage of which the Femto base station is located; and relaying the received services from the Femto base station so that the mobile terminal can receive the relayed services directly from the Femto base station when the mobile terminal is in the second specific mode.

2. The method of claim 1, further comprising:

modifying at the Femto base station the modulation and/or the coding scheme of received broadcast services.

3. The method of claim 2, wherein the relaying uses a 16-QAM modulation scheme.

4. The method of claim 2, wherein the relaying uses a 64-QAM modulation scheme.

5. A Femto base station for transmitting broadcast services from a radiocommunication cellular network to a mobile terminal, the Femto base station connected to the radiocommunication cellular network via a high speed Internet connection for enabling voice or data communications between the mobile terminal and the radiocommunication cellular network when the mobile terminal is in the coverage of the Femto base station, the Femto base station comprising:

an antenna configured to (1) directly receive services which are broadcast by a global base station among a plurality of global base stations of the radiocommunication cellular network in the coverage of which the Femto base station is located; and (2) relay the received services so that mobile terminal can receive the relayed services directly from the Femto base station if the mobile terminal is in the coverage of the Femto base station.

6. The Femto base station of claim 5, wherein the Femto base station is further configured to modify the modulation and/or the coding scheme of received broadcast services.

7. The Femto base station of claim 6, wherein the Femto base station is configured to relay the received services by using a 16-QAM modulation scheme.

8. The Femto base station of claim 6, wherein the Femto base station is configured to relay the received services by using a 64-QAM modulation scheme.

9. The Femto base station of claim 5, wherein the high speed Internet connection is a DSL connection.

10. The Femto base station of claim 5, wherein the high speed Internet connection is a cable connection.

* * * * *